United States Patent
Aiello et al.

(10) Patent No.: US 6,976,146 B1
(45) Date of Patent: Dec. 13, 2005

(54) SYSTEM AND METHOD FOR EMULATING BLOCK APPENDED CHECKSUMS ON STORAGE DEVICES BY SECTOR STEALING

(75) Inventors: Anthony F. Aiello, Santa Clara, CA (US); John Lloyd, Roseville, CA (US); Kyquang Son, Hayward, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 258 days.

(21) Appl. No.: 10/152,448

(22) Filed: May 21, 2002

(51) Int. Cl.$^7$ ............................................. G06F 12/00
(52) U.S. Cl. ...................... 711/202; 711/114; 711/153; 714/6
(58) Field of Search ........................ 711/153, 202, 114; 714/6

(56) References Cited

U.S. PATENT DOCUMENTS

| | | |
|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,654,847 A | 3/1987 | Dutton |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,775,978 A | 10/1988 | Hartness |
| 4,796,260 A | 1/1989 | Schilling et al. |
| 4,817,035 A | 3/1989 | Timsit |
| 4,825,403 A | 4/1989 | Gershenson et al. |
| 4,837,680 A | 6/1989 | Crockett et al. |
| 4,847,842 A | 7/1989 | Schilling |
| 4,849,929 A | 7/1989 | Timsit |
| 4,849,974 A | 7/1989 | Schilling et al. |
| 4,849,976 A | 7/1989 | Schilling et al. |
| 4,849,978 A | 7/1989 | Dishon et al. |
| 4,870,643 A | 9/1989 | Bultman et al. |
| 4,899,342 A | 2/1990 | Potter et al. |
| 4,989,205 A | 1/1991 | Dunphy, Jr. et al. |
| 4,989,206 A | 1/1991 | Dunphy, Jr. et al. |
| 5,077,736 A | 12/1991 | Dunphy, Jr. et al. |
| 5,088,081 A | 2/1992 | Farr |
| 5,101,492 A | 3/1992 | Schultz et al. |
| 5,128,810 A | 7/1992 | Halford |
| 5,148,432 A | 9/1992 | Gordon et al. |

(Continued)

FOREIGN PATENT DOCUMENTS

EP    0997900 A2    5/2000

OTHER PUBLICATIONS

Arvin Park et al., Providing Fault Tolerance In Parallel Secondary Storage Systems, Nov. 7, 1986, Department of Computer Science, Princeton University, Princeton, New Jersey.

(Continued)

*Primary Examiner*—Mano Padmanabhan
*Assistant Examiner*—Mehdi Namazi
(74) *Attorney, Agent, or Firm*—Cesari and McKenna, LLP (57) ABSTRACT

A system and method for emulating conventional block appended checksums on storage devices that generally do not support such checksums in a block is provided. A grouping of data sectors with one or more checksum sectors is generated. This grouping is mapped to/from a file system data structure associated with a traditional block appended checksum disk drive.

61 Claims, 9 Drawing Sheets

U.S. PATENT DOCUMENTS

| | | |
|---|---|---|
| RE34,100 E | 10/1992 | Hartness |
| 5,163,131 A | 11/1992 | Row et al. |
| 5,166,936 A | 11/1992 | Ewert et al. |
| 5,179,704 A | 1/1993 | Jibbe et al. |
| 5,202,979 A | 4/1993 | Hillis et al. |
| 5,208,813 A | 5/1993 | Stallmo |
| 5,210,860 A | 5/1993 | Pfeffer et al. |
| 5,218,689 A | 6/1993 | Hotle |
| 5,233,618 A | 8/1993 | Glider et al. |
| 5,235,601 A | 8/1993 | Stallmo et al. |
| 5,237,658 A | 8/1993 | Walker et al. |
| 5,257,367 A | 10/1993 | Goodlander et al. |
| 5,274,799 A | 12/1993 | Brant et al. |
| 5,305,326 A | 4/1994 | Solomon et al. |
| 5,351,246 A | 9/1994 | Blaum et al. |
| 5,355,453 A | 10/1994 | Row et al. |
| 5,392,290 A | 2/1995 | Brown et al. |
| 5,410,667 A | 4/1995 | Belsan et al. |
| 5,485,579 A | 1/1996 | Hitz et al. |
| 5,517,484 A | 5/1996 | Takagi et al. |
| 5,537,567 A | 7/1996 | Galbraith et al. |
| 5,579,475 A | 11/1996 | Blaum et al. |
| 5,623,595 A | 4/1997 | Bailey |
| 5,666,511 A | 9/1997 | Suganuma et al. |
| 5,696,775 A | 12/1997 | Nemazie et al. |
| 5,758,057 A | 5/1998 | Baba et al. |
| 5,765,183 A | 6/1998 | Kojima et al. |
| 5,802,366 A | 9/1998 | Row et al. |
| 5,805,788 A | 9/1998 | Johnson |
| 5,812,753 A | 9/1998 | Chiariotti |
| 5,819,292 A | 10/1998 | Hitz et al. |
| 5,862,158 A | 1/1999 | Baylor et al. |
| 5,864,655 A | 1/1999 | Dewey et al. |
| 5,884,098 A | 3/1999 | Mason, Jr. |
| 5,903,532 A | 5/1999 | Ikeda |
| 5,931,918 A | 8/1999 | Row et al. |
| 5,941,972 A | 8/1999 | Hoese et al. |
| 5,963,962 A | 10/1999 | Hitz et al. |
| 6,006,308 A | 12/1999 | Matsunami et al. |
| 6,065,037 A | 5/2000 | Hitz et al. |
| 6,092,215 A | 7/2000 | Hodges et al. |
| 6,138,201 A | 10/2000 | Rebalski |
| 6,158,017 A | 12/2000 | Han et al. |
| 6,223,300 B1 | 4/2001 | Gotoh |
| 6,289,356 B1 | 9/2001 | Hitz et al. |
| 6,317,844 B1 | 11/2001 | Kleiman |
| 6,425,035 B2 | 7/2002 | Hoese et al. |
| 6,532,548 B1 | 3/2003 | Hughes |
| 6,581,185 B1 | 6/2003 | Hughes |
| 6,836,832 B1 | 12/2004 | Klinkner |
| 2002/0161972 A1 * | 10/2002 | Talagala et al. ............ 711/114 |
| 2002/0162076 A1 * | 10/2002 | Talagala et al. ............ 714/819 |

OTHER PUBLICATIONS

David A. Patterson et al., A Case for Redundant Arrays of Inexpensive Disks (RAID), 1998 ACM, pp. 109-116.
Anvin, Peter H, "*The Mathematics of RAID 6,*" Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks,* Technical Memorandum 45312-891206-01TM, AT&T, Bell Laboratories, Department 45312, Holmdel, NJ, Dec. 1989.
Bitton, Dina, *Disk Shadowing,* Proceedings of the 14th VLDB Conference, LA, CA (1988).
Bultman, David L., *High Performance SCSI Using Parallel Drive Technology,* In Proc. Buscon Conf., pp. 40-44, Anaheim, CA, Feb. 1988.
Chen, Peter M., et al., *Two Papers on RAIDs.* Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890,* Performance Evaluation, pp. 74-85, 1990 - check to see if exact same copy as one in WAFL.
Chen, Peter M., et al., Maximizing Performance in a Striped Disk Array, Proc. 1990 *ACM SIGARCH 17th Intern.* Symp. on Comp. Arch., Seattle, WA, May 1990, pp. 322-331.
Chen, Peter M., et al., *RAID:High Performance, Reliable Secondary Storage,* ACM Computing Surveys, 26(2):145-185, Jun. 1994.
Chervenak, Ann L., *Performance Measurement of the First RAID Prototype,* Technical Report UCB/CSD 90/574, Computer Science Division (EECS), University of California, Berkeley, May 1990.
Copeland, George, et al., "*A Comparison of High-Availability Media Recovery techniques,*" in Proc. ACM-SIGMOD Int. Conf. Management of Data, 1989.
Courtright II, William V., et al., *RAIDframe: A Rapid Prototyping Tool for RAID Systems,* Computer Science Technical Report CMU-CS97-142, Carnegie Mellon University, Pittsburgh, PA 15213, Jun. 4, 1997.
Evans *The Tip of the Iceberg:RAMAC Virtual Array - Part I,* Technical Support, Mar. 1997, pp. 1-4.
Gibson, Garth A., et al., *Coding Techniques for Handling Failures in Large Disk Arrays,* Technical Report UCB/CSD 88/477, Computer Science Division, University of California, (Jul. 1988).
Gibson, Garth A., et al., *Failure Correction Techniques for Large Disk Arrays,* In Proceedings Architectural Support for Programming Languages and Operating Systems, Boston, Apr. 1989, pp. 123-132.
Gibson, Garth A., et al., *Strategic Directions in Storage I/O Issues in Large-Scale Computing,* ACM Computing Survey, 28(4):779-93, Dec. 1996.
Goldick, Jonathan S., et al., *Multi-resident AFS: An Adventure in Mass Storage,* In Proceedings of the 1995 USENIX Technical Conference, pp. 47-58, Jan. 1995.
Graham, Susan L., et al., *Massive Information Storage, Management, and Use,* (NSF Institutional Infrastructure Proposal), Technical Report No. UCB/CSD 89/493, Jan. 1989.
Gray, Jim et al., *Parity striping of disc arrays: Low-Cost Reliable Storage with Acceptable Throughput.* In Proceedings of the 16th Very Large Data Bases Conference, pp. 148-161, Brisbane, Australia, 1990.
Grimes, DW Martinez, *Two Dimensional Parity Error Correction Procedure,* IBM Technical Disclosure Bulletin 2686-2689, Oct. 1982.
Grimes, DW Martinez, *Vertical Parity Generator for Two Dimensional Parity,* IBM Technical Disclosure Bulletin 2682-2685, Oct. 1982.
Hellerstein, Lisa, et al., *Coding Techniques for Handling Failures in Large Disk Arrays.* In Algorithmica vol. 2, Nr. 3, 182-208 (1994).
Hughes, James, et al., *High Performance RAIT,* Tenth NASA Goddard Conference on Mass Storage Systems and Technologies and Nineteenth IEEE Symposium on Mass Storage Systems, Adelphi, Maryland, USA, Apr. 2002.
Johnson, Theodore, et al., *Tape Group Parity Protection,* IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

NG, Spencer, et al., *Trade-Offs Between Devices and Paths in Achieving Disk Interleaving*, IEEE International Symposium on Computer Architecture, 1988, pp. 196-201.

NG, Spencer, *Some Design Issues of Disk Arrays*, Proceedings of COMPCON Spring '89, pp. 137-42. IEEE, 1989.

Park, Arvin, et al., *Providing Fault Tolerance In Parallel Secondary Storage Systems*, Technical Report (CS-TR-057-86, Princeton, Nov., 1986.

Patel, Arvin M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, (CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, 1-3 Jun. 1988, SIGMOD RECORD (17)3:109-16 (Sept. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin, et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al., *Redundant Optical Storage system Using DVD-RAM Library*, IEEE Symposium on Mass Storage, pp. 80-87, Mar. 1999.

TEKROM -14 "About RAID 6"

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-36.

* cited by examiner

SYSTEM AND METHOD FOR EMULATING BLOCK APPENDED CHECKSUMS ON STORAGE DEVICES BY SECTOR STEALING

FIELD OF THE INVENTION

This invention relates to disk drives, and more particularly to block appended checksums on disk drives.

BACKGROUND OF THE INVENTION

A file server is a computer that provides file service relating to the organization of information on storage devices, such as disks. The file server or filer includes a storage operating system that implements a file system to logically organize the information as a hierarchical structure of directories and files on the disks. Each "on-disk" file may be implemented as a set of disk blocks configured to store information, such as text, whereas the directory may be implemented as a specially-formatted file in which information about other files and directories are stored. A filer may be configured to operate according to a client/server model of information delivery to thereby allow many clients to access files stored on a server, e.g., the filer. In this model, the client may comprise an application, such as a file system protocol, executing on a computer that "connects" to the filer over a computer network, such as a point-to-point link, shared local area network (LAN), wide area network (WAN), or virtual private network (VPN) implemented over a public network such as the Internet. Each client may request the services of the filer by issuing file system protocol messages (in the form of packets) to the filer over the network.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as meta-data, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system that manages data access and may, in the case of a filer, implement file system semantics, such as the Data ONTAP™ Storage operating system, implemented as a microkernel, and available from Network Appliance, Inc., of Sunnyvale, Calif., which implements Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate caching of parity information with respect to the striped data. In the example of a WAFL file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity) partitions in a single disk) arranged according to a RAID 4, or equivalent high-reliability, implementation.

Disk drives may have only one size of sector on it. A disk sector (or block) is the basic storage unit of a disk drive. A disk drive is comprised of one of more platters of magnetic material. Each platter is further divided into a number of tracks. Each of these tracks is further divided into sectors. A sector is thus the smallest unit of a typical disk drive. Two common sizes of disk blocks or sectors are 512 bytes per sector (BPS) and 520 BPS.

Disk drives may sometimes prove unreliable in storing and/or returning data. Disk drives may issue spurious confirmations that an input/output (I/O) operation occurred when the operation did not occur, or that it occurred, but with incorrect data. To avoid problems from unreliable operation, and to verify data integrity, check-summing methodologies have been employed in disk read/write operations. One example of such a checksum methodology is the use of block appended checksums. Block appended checksums are described in U.S. patent application Ser. No. 09/696,666, entitled BLOCK-APPENDED CHECKSUMS, by Andy Kahn, et al, filed on Oct. 15, 2000 which is hereby incorporated by reference. One known implementation of block appended checksums (BAC) utilizes 520 BPS disks wherein the first 512 bytes of the sector represent data to be stored with the remaining eight bytes representing a checksum value. One example of methodology to compute such checksum is by adding, without carrying, all the data bytes. To verify this calculated checksum, the two's compliment is calculated and then added, again without carrying to the checksum. If the result is zero, the checksum is proper.

One noted disadvantage of block appended checksums is that they typically can only be utilized with disks having 520 BPS and many storage systems support only 512 bytes per sector. In these file systems, it is not possible to, for example, use a 512 BPS disk by storing 504 bytes of data and eight bytes of checksum information. Rather all 512 bytes must be allocated to data storage. In known storage system configurations that utilize 512 BPS disks, block appended checksums generally cannot be used. However, the use of 512 BPS disks may be necessary as this may be the only bytes per sector value allowed by some class of disk storage.

One known method to implement non-block appended checksums in 512 BPS disks is to store separately the checksum information on a different storage location in the disk. For example, a set number of disk sectors could be set aside at a predetermined disk location (e.g., the last X sectors of the disk) for storing checksum information. These predetermined disk locations for storing checksum information are contiguous blocks located in a reserved area of the disk. A noted disadvantage of this technique is that, to access the data and checksum information, two separate read operations are required. Thus, to access data and its corresponding checksum information, the disk needs to locate and read the data from its physical location on the disk and then locate and read the checksum information. Similarly, when writing data, the disk must first write the actual data in its proper data sector and then write the checksum to another sector located remotely from the data sector. As the checksum sectors are physically separate from the data sectors, the disk drive head must move and locate the appropriate sectors. The execution of multiple read/write operations, combined with continuous head shuffling, may significantly increase system overhead and degrade file service performance.

SUMMARY OF THE INVENTION

The disadvantages of the prior art are overcome by providing a system and method for emulating block appended checksums on 512 BPS disks, or other disks not adapted for storage of checksums in the same sector as the data, by grouping data sectors and a checksum sector into a logical grouping of sectors. Input/output operations are then concurrently performed on this grouping of sectors in one operation based upon the inherent read/write functionality of the disk drive. In an illustrative embodiment, the storage operating system and file system layer of the storage operating system perform input/output operations on 4-kilobyte (KB) blocks of data. Using 512 BPS disks, eight sectors are needed to store the requisite 4 kilobytes of data. Thus, a ninth sector is grouped with the required eight data sectors. A portion of this ninth sector is utilized to store the block appended checksum information, while the remaining space on the ninth sector is reserved for expanding functionality or to store other data.

By grouping a checksum sector with the data sectors, additional reads and/or writes are not necessary to store or retrieve the checksum information. A checksum layer of the storage operating system transparently maps each of the nine-sector groupings to the requisite conventional data block that the upper layers of a storage operating system expect to encounter from a traditional block appended checksum disk. The storage operating system thus functions as if it is manipulating 520 BPS block appended checksum disks while such disks are actually arranged with less than 520 BPS (e.g. 512 BPS).

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
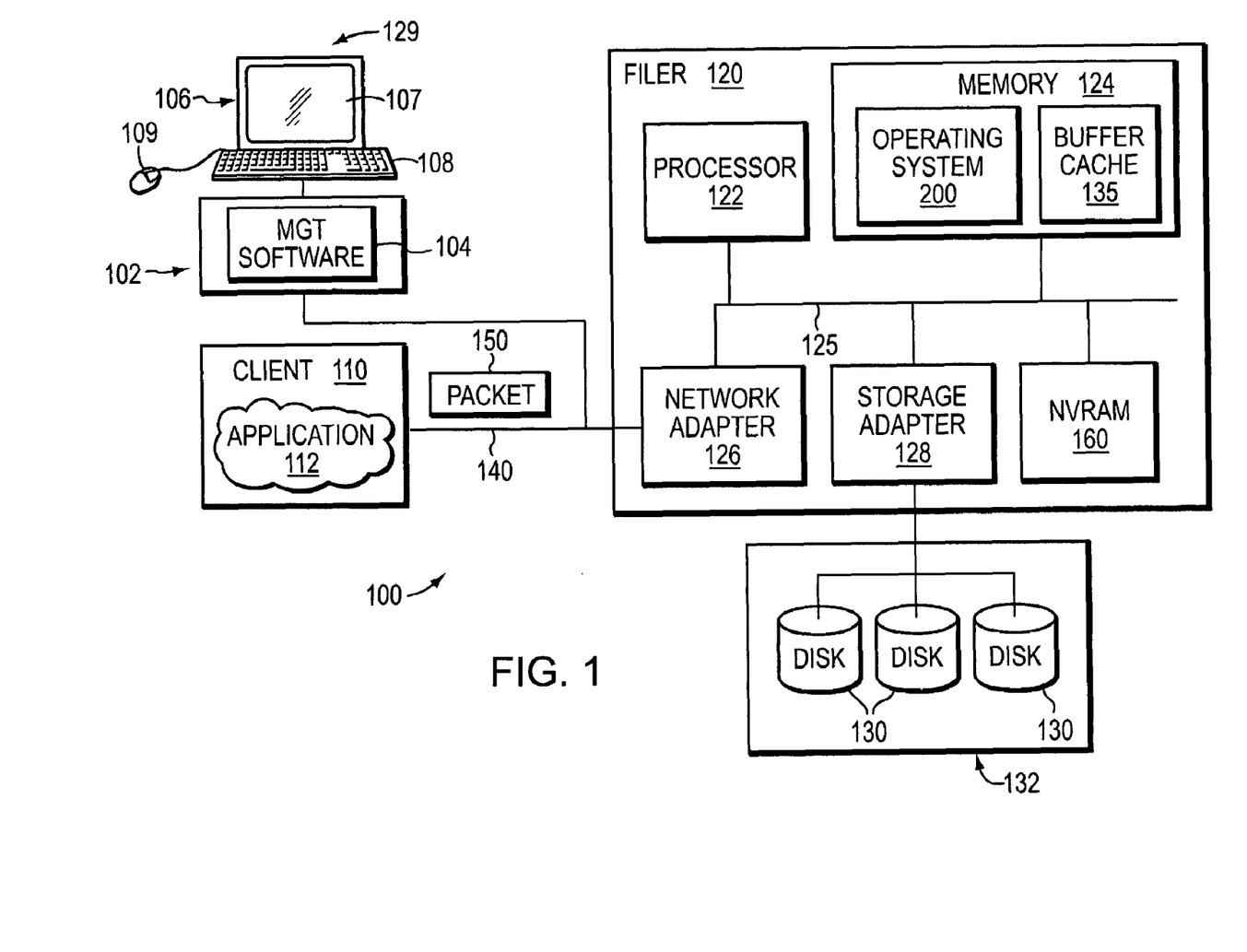
FIG. 1 is a schematic block diagram of a network environment and file server in accordance with the present invention.

By way of further background, FIG. 1 is a schematic block diagram of a storage system environment 100 that includes a client 110 having one or more applications 112, and an interconnected file server 120 that may be advantageously used with the present invention. The file server or "filer" 120 is a computer that provides file service relating to the organization of information on storage devices, such as disks 130. It will be understood to those skilled in the art that the inventive technique described herein may apply to any type of special-purpose computer (e.g., server) or general-purpose computer, including a standalone computer. The filer 120 comprises a processor 122, a memory 124, a network adapter 126 and a storage adapter 128 interconnected by a system bus 125. The filer 120 also includes a storage operating system 200 that implements a file system to logically organize the information as a hierarchical structure of directories and files on the disks. A console or other user interface 129 is provided to control various filer functions, including those implemented according to this invention, and report on the status of filer operations.

It will be understood to those skilled in the art that the inventive technique described herein may apply to any type of special-purpose computer (e.g., file serving appliance) or general-purpose computer, including a standalone computer, embodied as a storage system. To that end, filer 120 can be broadly, and alternatively, referred to as storage system. Moreover, the teachings of this invention can be adapted to a variety of storage system architectures including, but not limited to, a network-attached storage environment, a storage area network and disk assembly directly-attached to a client/host computer. The term "storage system" should, therefore, be taken broadly to include such arrangements.

In the illustrative embodiment, the memory 124 comprises storage locations that are addressable by the processor and adapters for storing software program code. A portion of the memory may be further organized as a "buffer cache" 135 for storing data structures that are passed between disks and the network during normal runtime operation. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The operating system 200, portions of which are typically resident in memory and executed by the processing elements, functionally organizes the filer by, inter alia, invoking storage operations in support of a file service implemented by the filer. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the filer 120 to a client 110 over a computer network 140, which may comprise a point-to-point connection or a shared medium, such as a local area network. The client 110 may be a general-purpose computer configured to execute applications 112, such as a database application. Moreover, the client 110 may interact with the filer 120 in accordance with a client/server model of information delivery. That is, the client may request the services of the filer, and the filer may return the results of the services requested by the client, by exchanging packets 150 encapsulating, e.g., the CIFS protocol or NFS protocol format over the network 140.

The storage adapter 128 cooperates with the operating system 200 executing on the filer to access information requested by the client. The information may be stored on the disks 130 of a disk array that is attached, via the storage adapter 128 to the filer 120 or other node of a storage system as defined herein. The storage adapter 128 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 122 (or the adapter 128 itself) prior to being forwarded over the system bus 125 to the network adapter 126, where the information is formatted into a packet and returned to the client 110.

In one exemplary filer implementation, the filer 120 can include a nonvolatile random access memory (NVRAM) 160 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain time-based chunk of transactions (for example, several seconds worth). The NVRAM is filled, in parallel with the buffer cache, after each client request is completed, but before the result of the request is returned to the requesting client.

Connected to the LAN 140 may be a station using which a maintenance operator can interface with the system. A management station 102 can include a server or PC-based computer in a console 129 with a network interface for communicating over the LAN 140. Within the management station 102, resides appropriate management software 104. A graphical user interface (GUI) 106 may include a display 107, a keyboard 108 and a mouse 109 so that a maintenance operator can enter commands into the system.

In an illustrative embodiment, the disk array 132 is arranged as a plurality of separate volumes each having a file system associated therewith, as described further. The volumes each include one or more RAID groups of disks 130. In one embodiment, the RAID groups can each include independent physical disks 130 including those storing striped data and those storing separate parity for the data, in accordance with a preferred RAID 4 configuration. However, other configurations (e.g. RAID 5 having distributed parity across stripes) are also contemplated. In this embodiment, a minimum of one parity disk and one data disk is employed. However, a typical implementation may include three data and one parity disk per RAID group, and a multiplicity of RAID groups per volume.

B. Storage Operating System

To facilitate generalized access to the disks 130 on the array 132, the storage operating system 200 (FIG. 2) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that manages data access an may implement file system semantics (such as the above-referenced WAFL). In this sense, the Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Figure 2:
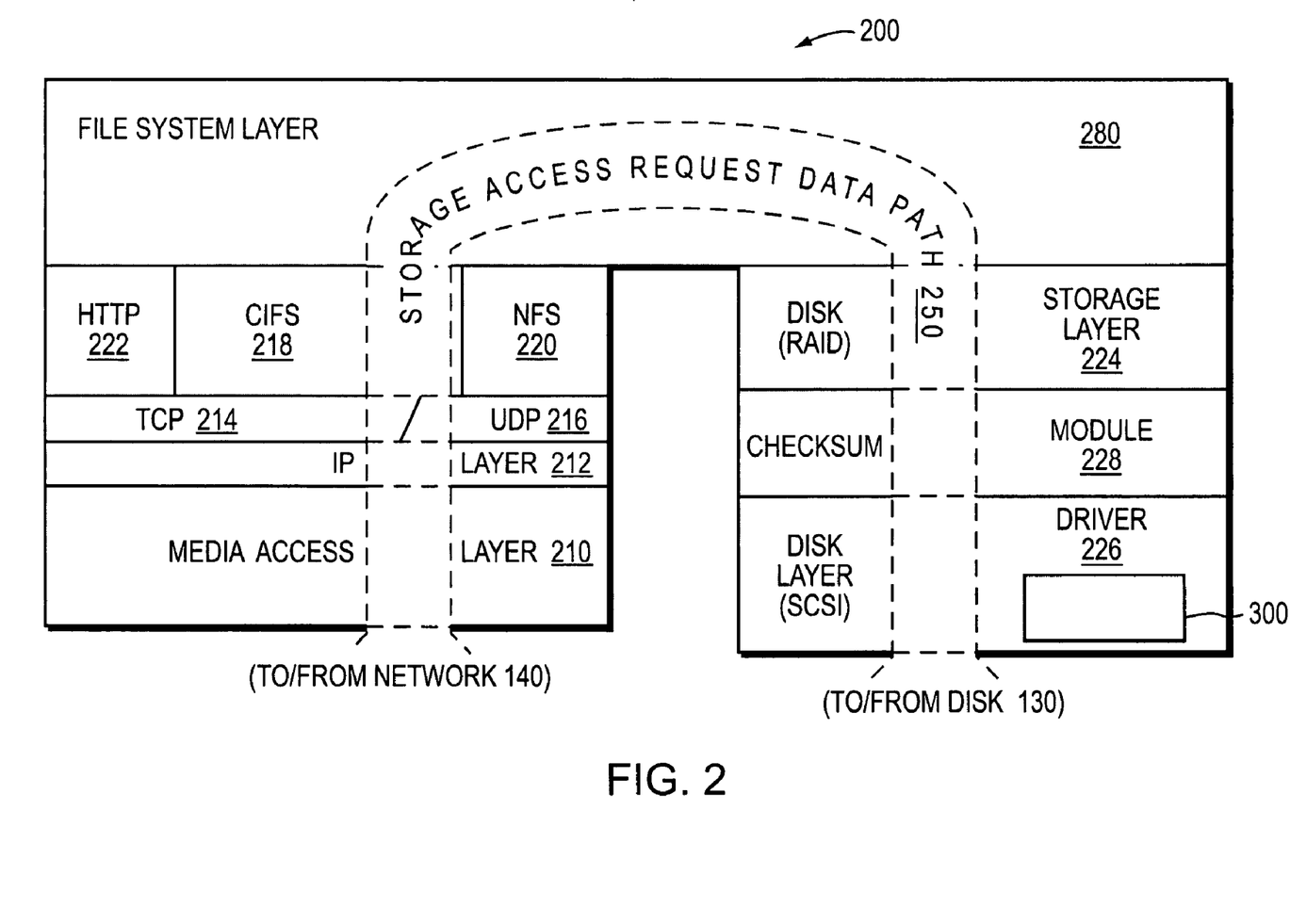
FIG. 2 is a schematic block diagram of a storage operating system that is advantageously used in conjunction with the file server of FIG. 1 in an embodiment of this invention.

The organization of the preferred storage operating system for the exemplary filer is now described briefly. However, it is expressly contemplated that the principles of this invention can be implemented using a variety of alternate storage operating system architectures. As shown in FIG. 2, the storage operating system 200 comprises a series of software layers, including a media access layer 210 of network drivers (e.g., an Ethernet driver). The operating system further includes network protocol layers, such as the Internet Protocol (IP) layer 212 and its supporting transport mechanisms, the Transport Control Protocol (TCP) layer 214 and the User Datagram Protocol (UDP) layer 216. A file system protocol layer provides multi-protocol data access and, to that end, includes support for the Common Internet File System (CIFS) protocol 218, the Network File System (NFS) protocol 220 and the Hypertext Transfer Protocol (HTTP) protocol 222.

Additionally, the storage operating system includes a disk storage layer 224 that implements a disk storage protocol such as a redundant array of independent disks (RAID) protocol and a disk driver layer 226 that implements a disk access protocol such as, e.g., a small computer systems interface (SCSI) protocol. The disk driver layer 226 includes a table 300 that contains look up information regarding various disks and their bytes per sector capabilities. This table, described further below, is utilized in the emulation of block appended checksums in accordance with this invention.

The storage operating system 200 also includes a disk storage layer 224 that implements a disk storage protocol, such as a RAID protocol, and a disk driver layer 226 that implements a disk access protocol such as, e.g., a Small Computer Systems Interface (SCSI) protocol. Additionally, the storage operating system includes a checksum module 228. The checksum module 228 performs the grouping of data and checksum sectors described further below. The checksum module maps, transparently to the upper layers of the storage operating system, these sector groupings to the data block normally produced by a 520 BPS disk implementing block appended checksums.

Bridging the disk software layers with the network and file system protocol layers is a file system layer 280 of the storage operating system 200. Generally, the file system layer 280 implements a file system having an on-disk format representation that is block-based using, e.g., 4-kilobyte (KB) data blocks and using inodes to describe the files. In response to transaction requests, the file system generates operations to load (retrieve) the requested data from volumes 134 if it is not resident "in-core", i.e., in the filer's memory 124. If the information is not in memory, the file system layer 280 indexes into the inode file using the inode number to access an appropriate entry and retrieve a logical volume block number. The file system layer 280 then passes the logical volume block number to the disk storage (RAID) layer 224, which maps that logical number to a disk block number and sends the latter to an appropriate driver (for example, an encapsulation of SCSI implemented on a fibre channel disk interconnection) of the disk driver layer 226. The disk driver accesses the disk block number from volumes 134 and loads the requested data in memory 124 for processing by the filer 120. Upon completion of the request, the filer (and storage operating system) returns a reply, e.g., a conventional acknowledgement packet defined by the file-oriented protocol of which the Common Internet File System (CIFS) is an example, to the client 110 over the network 140.

It should be noted that the software "path" 250 through the storage operating system layers described above needed to perform data storage access for the client request received at the filer may alternatively be implemented in hardware or a combination of hardware and software. That is, in an alternate embodiment of the invention, the storage access request data path 250 may be implemented as logic circuitry embodied within a field programmable gate array (FPGA) or an application specific integrated circuit (ASIC). This type of hardware implementation increases the performance of the file service provided by filer 120 in response to a file system request packet 150 issued by client 110.

C. Block Appended Checksum Emulation

Figure 3:
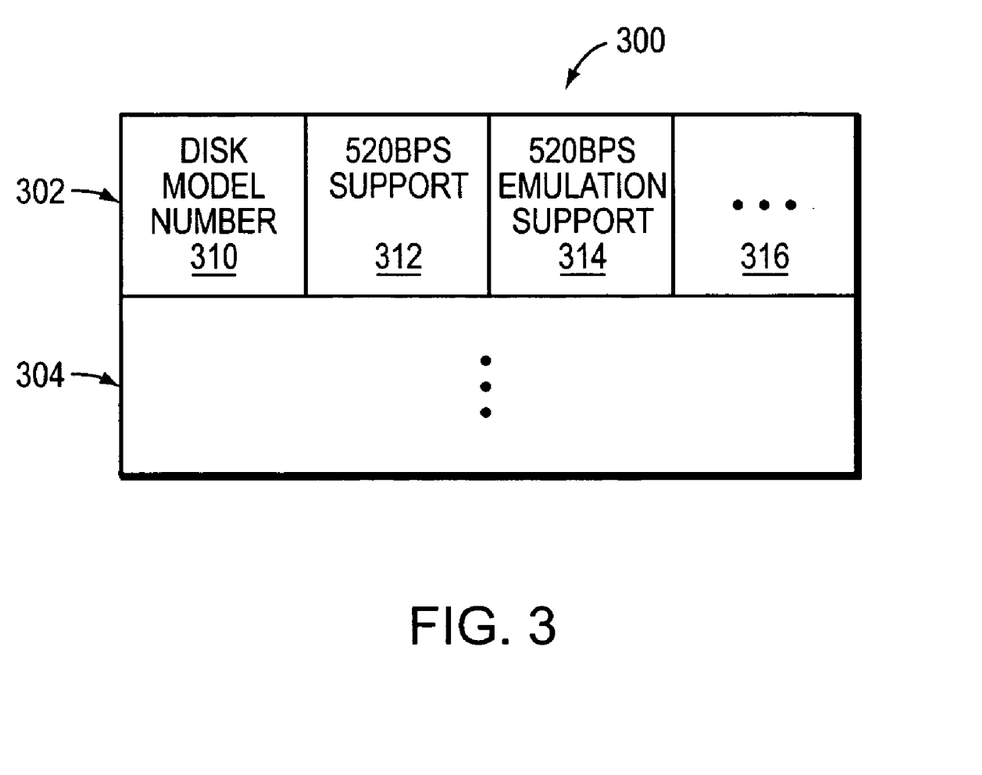
FIG. 3 is a schematic block diagram of a disk look up table in accordance with an embodiment of this invention.

FIG. 3 is a schematic block diagram of an exemplary look up table 300 contained within the disk driver layer 226 of the storage operating system 200. The look up table has a plurality of entries 302 and 304 that identify the types of disk drives and their capabilities. Exemplary entry 302 has fields for the disk model number 310, whether that disk model supports 520 BPS (field 312), whether that disk model number supports 520 BPS emulation in accordance with this invention (field 314) and, in alternate embodiments, additional fields 316. In one embodiment, the look-up table 300 is manually updated as new disk drives are released. Thus, new upgrades of this look up table must be regularly obtained by a system administrator or user from, e.g., the vendor of the storage operating system. When the administrator or user of a file server creates a volume using 512 BPS disks, the available disks that can be utilized in emulating a block appended checksum disk can be determined by looking up the available disks' characteristics in the look up table 300. Only those disks that support 520 BPS, either as a native format or through emulation, are used in such a volume. Selection of disks that are acceptable for use in the volume can either be performed manually by the administrator or user or automatically by a process within the storage operating system. One example of this automatic preselection is described in copending U.S. patent application Ser. No. 10/027,909 by Stephen Klinkner entitled SYSTEM AND METHOD FOR PRE-SELECTING CANDIDATE DISKS ON VALIDITY FOR VOLUME.

Figure 4:
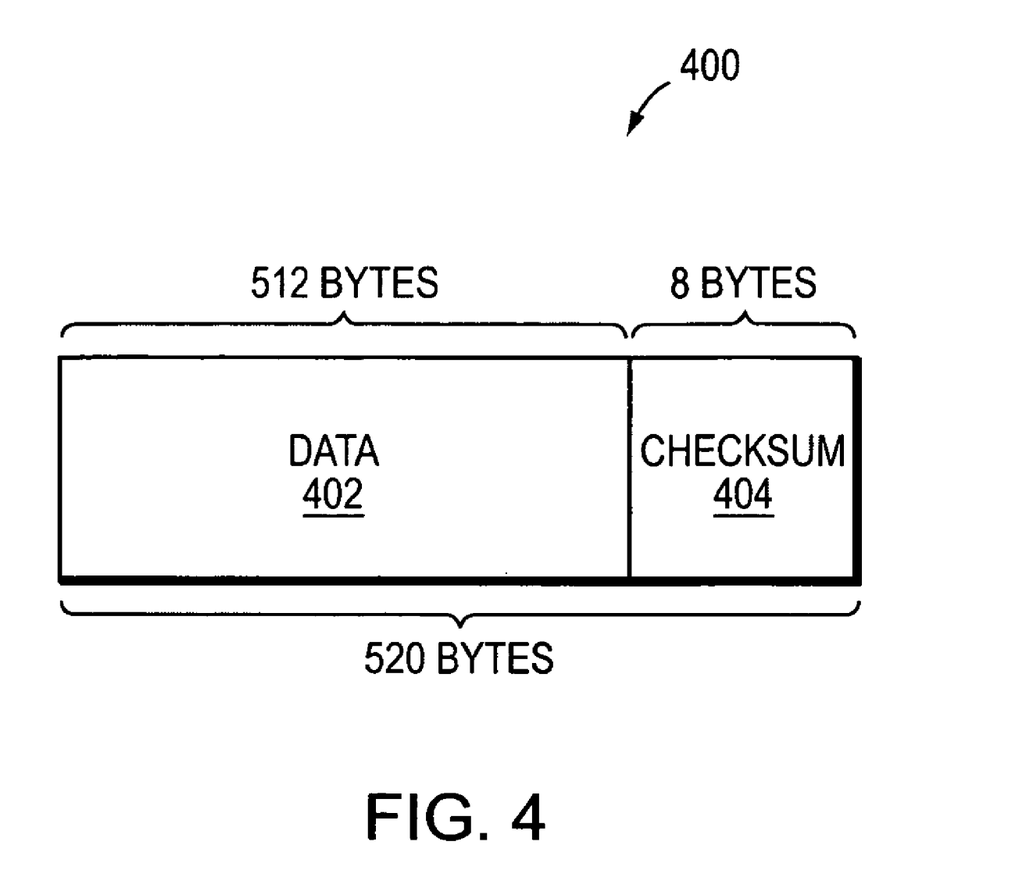
FIG. 4 is a schematic block diagram of an exemplary 520 BPS disk sector showing data and checksum information.

FIG. 4 is a schematic block diagram of conventional 520 BPS disk block using block appended checksums for use with a file system which operates on 512 bytes of data at a time. Using conventional block appended checksums, the 520 BPS sector 400 is divided into a 512-byte data section 402 and an eight-byte checksum 404. The checksum is computed using known techniques, such as the addition without carrying methodology described above.

In the exemplary storage operating system 200, the file system layer 280 performs input/output (I/O) operations in 4 KB (4,096 byte) data blocks. When using 520 BPS disks with block appended checksums, eight sectors are required to hold the 4,096 bytes of data. In known implementations the first 4,096 bytes of the eight sectors stores the data with the last 64 bytes allocated to storing the checksum information. Using 512 BPS disks, a 4,096-byte I/O operation requires eight full sectors of data. To include the appropriate checksum information, an additional sector is needed for storage of the requisite eight-byte checksum information. In the illustrative embodiment, the disk driver 226 of the storage operating system, when using an emulated block appended checksum disk, groups sectors together into nine-sector groupings comprising eight data sectors and a ninth sector containing checksum information. The disk driver layer is, in effect, "stealing" a ninth sector to store checksum information thereon. Through such sector stealing, a slight loss of available storage space on the disk drive results, but as 512 BPS disks may be significantly larger in overall storage capacity than 520 BPS disks, this minimal loss of one out of every nine sectors does not adversely affect the storage capacity of the disks. This sector stealing is made transparent to the higher layers of the storage operating system by the disk driver. By "transparent" it is meant that to the upper layers of the storage operating-system, the disk appears to be comprised of 520 BPS having 520 bytes of addressable space per sector. Thus, for example, to the file system layer 280, disk I/O is performed on eight 520 BPS disk sectors. The grouping and data translation from nine 512 BPS sectors to an emulated eight 520 BPS sectors, described further below, is performed by the checksum module. It should be noted that the grouping of disk sectors into nine-sector groups of eight data sectors and a ninth checksum sector does not require that the sectors in a particular group be contiguous on the disk's surface. Additionally, it should be noted that in accordance with the present invention, the checksum sectors do not need to be located in any specific location on the disk drive. Checksum sectors may be written to any location on the disk. The grouping can be a logical grouping of the sectors. However, it is noted that even greater improvement to file system performance is achieved when the disk sectors are contiguous on the disk's surface.

It should also be noted that, while this embodiment is described in terms of nine-sector groupings, having eight data sectors and a checksum sector, the principles of this invention can apply to any sized grouping. For example, if the storage operating system performs input/output operations in 8 KB blocks of data, the disk driver layer would make seventeen-sector groupings. These exemplary seventeen-sector groupings would be comprised of sixteen 512 BPS sectors storing 8,192 bytes of data, and a seventeenth sector storing 128 bytes of checksum information. As such, the nine-sector grouping should be taken as illustrative only.

Figure 5:
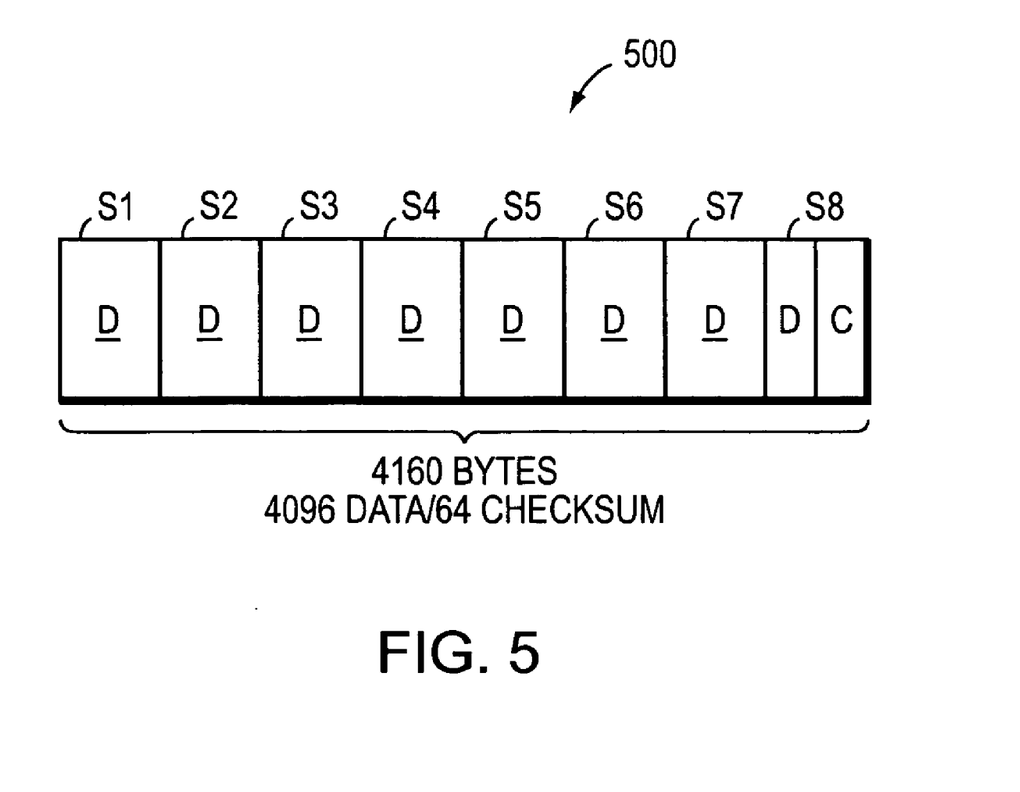
FIG. 5 is a schematic block diagram of a nine-sector grouping of 512 BPS disk sectors in accordance with this invention.

FIG. 5 shows a 4,160 byte data structure 500 which represents a grouping of eight 520 BPS sectors S1–S8 (contiguous in this example). This 4,160 byte data structure 500 yields 4,096 bytes of data D and 64 bytes of checksum information C. The 4,096 bytes of data is stored in sectors S1–S8, with the checksum information being stored in the available space in sector S8. As stated earlier, in one embodiment the file system operates on 4,096 bytes at a time. Thus, in that embodiment, the data structure 500 would reflect the basic read and/or write data structure utilized by the file system.

Figure 6:
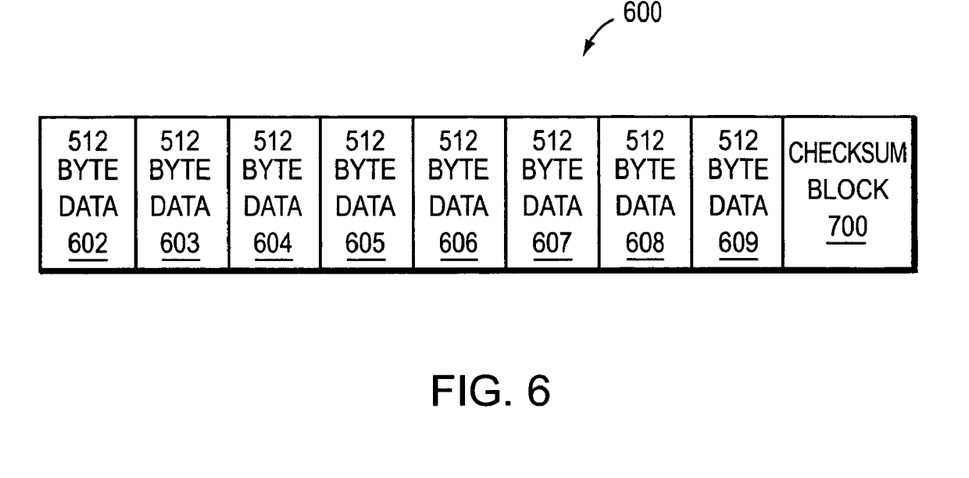
FIG. 6 is a schematic block diagram of a checksum sector of FIG. 5 in accordance with an embodiment of this invention.

FIG. 6 shows an exemplary nine-disk grouping 600 of 512 BPS sectors used to emulate block appended checksums in accordance with this invention. The sector grouping 600 includes eight 512-byte data sectors 602–609 and a checksum sector 700 as the ninth sector in the grouping. In this embodiment, nine 512 BPS sectors are utilized to hold 4,096 bytes of data and 64 bytes of checksum information. There are 448 bytes that are not utilized in the checksum sector. The disk driver, by grouping disk blocks into nine-sector groups, reduces the number of read/write I/O operations that must be performed.

Figure 7:
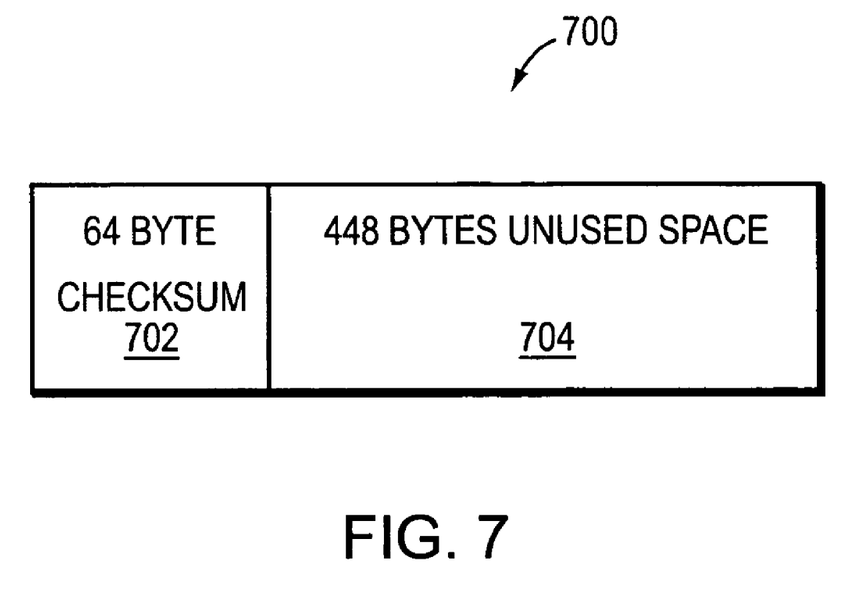
FIG. 7 is a schematic block diagram of an eight-sector grouping in accordance with an embodiment of this invention.

FIG. 7 is a more detailed schematic block diagram of the checksum sector 700 from FIG. 6. The checksum sector 700 includes, in an illustrative embodiment, a sixty-four-byte checksum 702 followed by 448 bytes of unused space 704. The checksum 702 contains, in one embodiment, eight bytes of checksum information for each of the other sectors in a particular group. In an alternate embodiment, the 448 bytes of unused space of the checksum sector is overwritten with zeros.

The disk driver of the storage operating system maps, during read operations, the nine-sector grouping 500 (see FIG. 5) to the 4,160 byte data structure 700 that the upper layers of the storage operating system utilize. Similarly, the disk driver maps the 4,190 byte data structure 700 to the nine-sector grouping 500 during write operations. This mapping is accomplished through known data movement and copying techniques.

Figure 8:
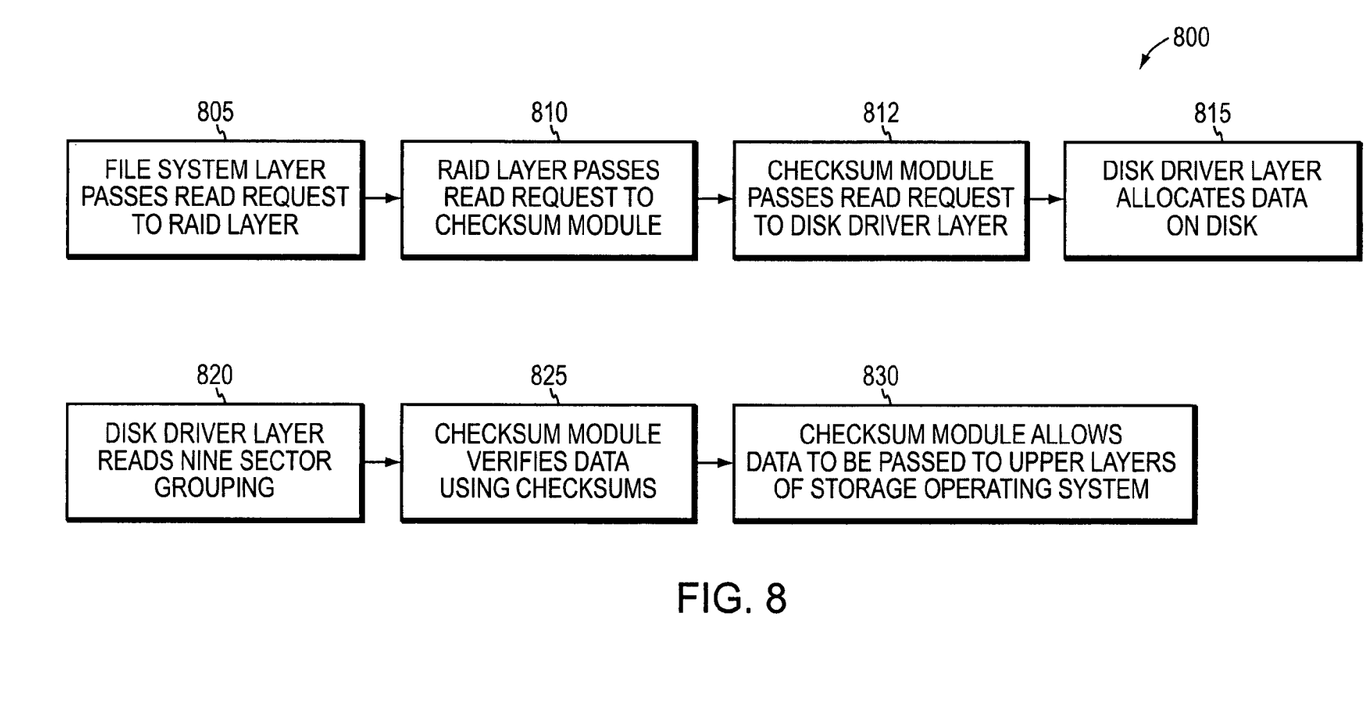
FIG. 8 is a flowchart detailing the procedure performed in executing a read operation in accordance with an embodiment of this invention.

The procedure 800 performed by the storage operating system in processing a read request on a disk utilizing emulated block appended checksums is detailed in FIG. 8. In step 805, the file system layer 280 (see FIG. 2) passes a read request to the RAID layer 224 of the storage operating system. The RAID layer determines which RAID group the particular data is stored on and then passes the read request to the checksum module (step 810). The checksum module then passes the read request to the disk driver layer in step 812. Next, in step 815, the disk driver layer locates the requested data on the disk. The nine-sector grouping is then read by the disk driver layer in step 820. This read operation is performed as a single operation of the disk drive. By "single operation" it is meant that the disk drive does not read the data sectors and then locate and read a checksum sector. This single operation read is enabled by the grouping of the data and checksum sectors in accordance with the teachings of this invention. The checksum module, in step 825, then verifies the data stored in the eight data sectors of the nine-sector grouping by using the 64 bytes of checksum information stored in the ninth sector.

If the data is properly verified, the checksum module allows the data to be passed to the upper layers of the storage operating system (step 830).

Figure 9:
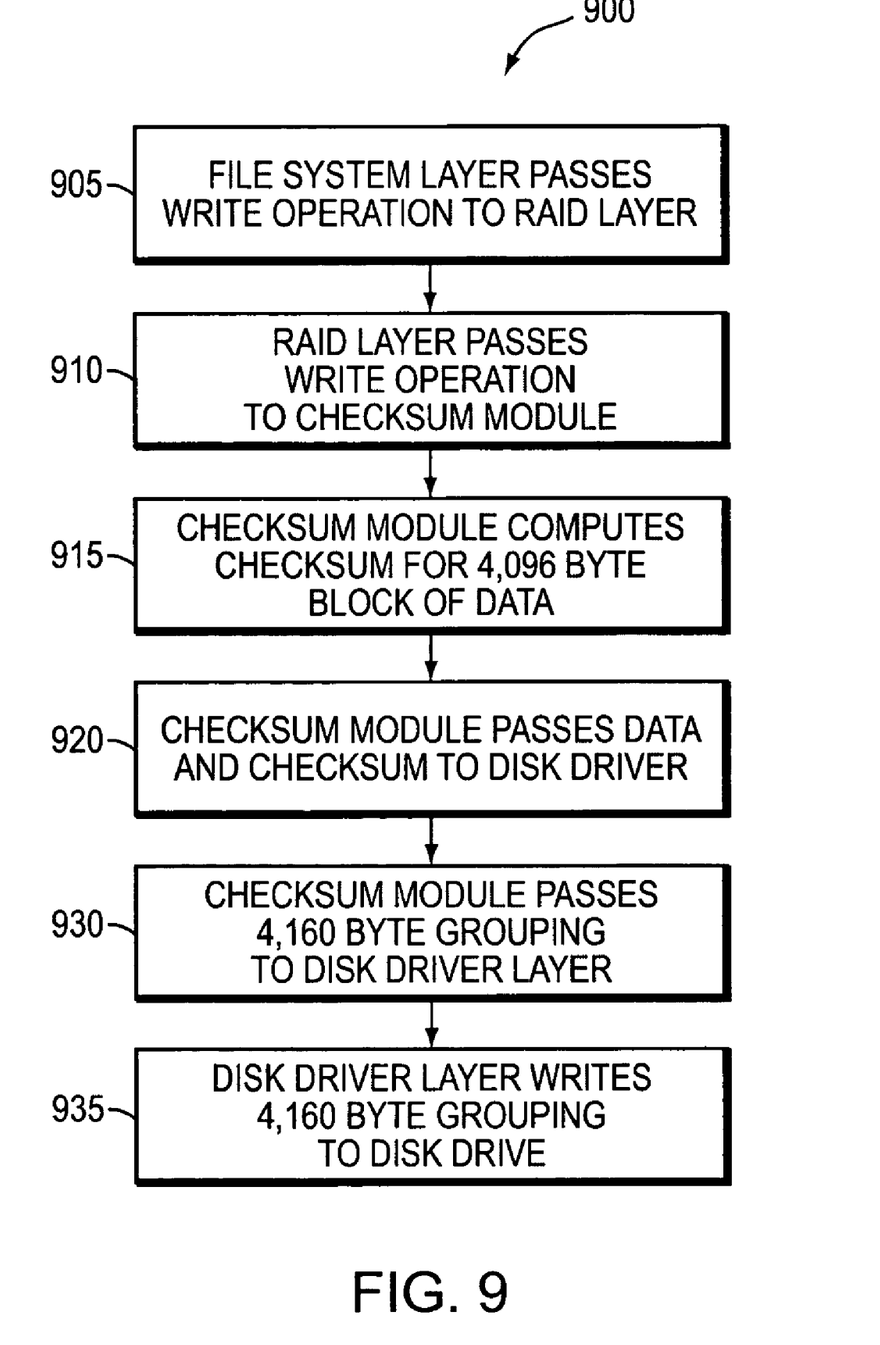
FIG. 9 is a flowchart detailing the procedure performed in executing a write operation in accordance with an embodiment of this invention.

FIG. 9 is a flowchart detailing the steps of the procedure 900 performed by the storage operating system in performing a write operation to a disk using emulated block appended checksums. In step 905, the file system layer passes a write operation to the RAID layer of the storage operating system. This write operation includes a file system data block comprising of, in the illustrative embodiment, a 4,096 byte data block. The RAID layer, in step 910, passes the write operation to the checksum module. The checksum module computes the checksum for all data bytes in the 4,096 block of data (step 915). Using these generated checksums and the 512 byte data blocks, the checksum module generates a 4,160 byte image to be transferred to disk (step 920). In step 930, the checksum module passes the 4,160 byte grouping to the disk driver layer. Finally, in step 935, the disk driver layer physically writes the nine-sector grouping to the disk drive. This write operation is performed as a single operation of the disk drive.

To again summarize, the disk driver of the storage operating system logically groups eight data sectors of 512 bytes with a checksum sector into nine-disk sector groupings. Disk input/output operations are then performed on such disk sector groupings in a single operation. The disk driver maps these nine-sector groupings to the data block associated with typical 520 BPS sectors utilizing block appended checksums. By grouping the checksum sector with the data sectors, additional read and/or write operations are not needed to store the requisite block appended checksum information on the physical disk drive. Improved file system performance results from this reduced number of disk access operations. The checksum sectors are not required to be stored in any particular location on disk, which further reduces the need for additional disk access operations. The present invention permits block appended checksums to be utilized on disks that do not support conventional block appended checksums.

The foregoing has been a detailed description of an illustrative embodiment of the invention. Various modifications and additions can been made without departing from the spirit and scope of the invention. For example, it should be understood groupings other than eight data sectors and one checksum sector can be utilized while remaining within the scope of the present invention. Additionally, while this description has been written in reference to filers and file servers the principles are equally pertinent to all types of computers, including general-purpose, special-purpose and stand-alone computers executing various types of operating and/or storage operating systems. Further, it is expressly contemplated that the teachings of this invention can be implemented in as software, including a computer-readable medium having program instructions executing on a computer, hardware, firmware, or a combination thereof. Additionally, while this description has been written such that a checksum module of the storage operating system performs the requisite mapping, it is expressly contemplated that other layers or components of the storage operating system, or the file server hardware/firmware or the disk device controllers and/or disk drives themselves can implement the mapping and sector sealing described herein. Accordingly, this description is meant to be taken only by way of example and not to otherwise limit the scope of the invention.

What is claimed is:

1. A method for a computer to emulate block appended checksums on a storage device, the method comprising the steps of:
    grouping a set of data sectors on the storage device with one or more checksum sectors, the one or more checksum sectors storing a checksum of data stored in the set of data sectors;
    mapping, in response to a read operation of the storage device by the computer, the grouping of data sectors and checksum sectors to a file system data structure, wherein the read operation is performed as a single operation; and
    mapping, in response to a write operation, a file system data structure to the set of data sectors and checksum sectors, wherein the write operation is performed as a single operation.

2. The method of claim 1 wherein the computer further comprises a file server.

3. The method of claim 1 wherein the set of data sectors further comprises eight data sectors.

4. The method of claim 1 wherein the one or more checksum sectors further comprises one checksum sector.

5. The method of claim 4 wherein the one or more checksum sectors further comprises 64 bytes of checksum information.

6. The method of claim 1 wherein the data sectors and checksum sectors are contiguous on the storage device.

7. The method of claim 1 wherein the one or more checksum sectors are written to any available location on the storage device.

8. The method of claim 1 wherein the data sectors and checksum sectors further comprise sectors having a size smaller than 520 bytes per sector.

9. The method of claim 8 wherein the data sectors and checksum sectors further comprise sectors having a size of 512 bytes per sector.

10. A computer for use with a storage device emulating block appended checksums, the computer comprising:
    means for forming a grouping of a set of data sectors of the storage device with a set of checksum sectors; and
    means for performing input/output operations with respect to the storage device by the computer utilizing the grouping of data sectors and checksum sectors so that the input/output operations are each performed on both the data sectors and checksums sectors in a single operation.

11. The computer of claim 10 wherein the data sectors and checksum sectors further comprise sectors having a size smaller than 520 bytes per sector.

12. The computer of claim 11 wherein the data sectors and checksum sectors further comprise sectors having a size of 512 bytes per sector.

13. The computer of claim 11 wherein the set of data sectors further comprises eight data sectors.

14. The computer of claim 10 wherein the set of checksum sectors further comprises one checksum sector.

15. A method for a computer to emulate block appended checksums on a storage device, the storage device being free of support for conventional block appended checksums, the method comprising the steps of:
    forming a group comprising of a set of data sectors and one or more checksum sectors, the one or more checksum sectors storing a checksum of data stored in the set of data sectors; and
    performing an input/output operation to the storage device utilizing the grouping so that the input/output operation is performed on both the data sectors and the one or more checksum sectors in a single operation.

16. The method of claim 15 wherein the computer further comprises a file server.

17. The method of claim 15 wherein the set of data sectors further comprises eight data sectors.

18. The method of claim 15 wherein the set of checksum sectors further comprises one checksum sector.

19. The method of claim 18 wherein the checksum sector further comprises 64 bytes of checksum information.

20. The method of claim 15 wherein the data sectors and checksum sectors are contiguous on the storage device.

21. The method of claim 15 wherein the one or more checksum sectors are written to any available location on the storage device.

22. The method of claim 15 wherein the data sectors and checksum sectors further comprise sectors having a size smaller than 520 bytes per sector.

23. The method of claim 15 wherein the data sectors and checksum sectors further comprise sectors having a size of 512 bytes per sector.

24. A computer-readable media, including program instructions executing on a computer, for emulating block appended checksums on a storage device, the computer-readable media including program instructions for performing the steps of:
    grouping a set of data sectors on the storage device with a set of checksum sectors;
    mapping, in response to a read operation of the storage device by the computer, the grouping of data sectors and checksum sectors to a file system data structure; and
    mapping, in response to a write operation to the storage device by the computer, a file system data structure to this set of data sectors and checksum sectors.

25. A method for emulating block appended checksums on a disk having a set sector size for use with a file system having a set data size, the method comprising the steps of:
    forming a group of sectors, the group of sectors comprising a number of sectors sufficient to store the set data size and an associated checksum;
    mapping the data sectors and the checksum sectors to a file system data structure; and
    performing input/output operations to the disk, wherein data written to the disk is mapped from the set of data structure to the group of sectors and wherein data retrieved from the disk is mapped from the group of sectors to the data structure.

26. The method of claim 25 wherein the set sector size further comprises 512 bytes per sector; and
    wherein a conventional block appended checksum requires a sector having a size of 520 bytes per sector.

27. The method of claim 25 wherein the set sector size further comprises 512 bytes per sector.

28. The method of claim 25 wherein the set data size further comprises 4,096 bytes.

29. A method for a computer to emulate block appended checksums using one or more 512 bytes per sector disks, the method comprising the steps of:
    forming a group comprising of a set of data sectors and one or more checksum sectors, the one or more checksum sectors storing a checksum of data stored in the set of data sectors; and performing an input/output operation to the one or more 512 bytes per sector disks utilizing the grouping so that the input/output operation is performed on both the data sectors and the one or more checksum sectors in a single operation.

30. A method for a computer to emulate a disk using block appended checksums having a first size of bytes per sectors using a disk having a second size bytes per sector, the method comprising the steps of:
    forming a group of sectors of the disk having the second size bytes per sector comprising of a set of data sectors and one or more checksum sectors, the one or more checksum sectors storing a checksum of data stored in the set of data sectors; and
    performing an input/output operation to the disk having the second size bytes per sector utilizing the grouping so that the input/output operation is performed on both the data sectors and the one or more checksum sectors in a single operation.

31. The method of claim 30 wherein the one or more checksum sectors may be stored at any location on the disk having the second size bytes per sector.

32. A computer, comprising:
    a storage device having a plurality of blocks to store one of either data or checksums; and
    a storage device driver to group a set of data blocks with one or more checksum blocks, the one or more checksum blocks storing a checksum of data stored in the set of data blocks, the group of data and checksum blocks arranged to permit input/output operations to be performed on the group of data and checksum blocks in a single operation.

33. The computer of claim 32 further comprising: a disk as the storage device, the disk drive having a plurality of sectors as the plurality of blocks.

34. The computer of claim 32 further comprising: read/write operations as the input/output operations.

35. The computer of claim 32 further comprising: a file server as the computer.

36. The computer of claim 32 further comprising: eight data blocks for the set of data blocks.

37. The computer of claim 32 further comprising: one checksum block.

38. The computer of claim 32 further comprising: a single checksum computed for the data stored in the set of data blocks.

39. The computer of claim 37 further comprising: 64 bytes of checksum information.

40. The computer of claim 32 further comprising: a contiguous grouping of data blocks and checksum blocks on the storage device.

41. The computer of claim 32 further comprising: the one or more checksum blocks are written to any available location on the storage device.

42. The computer of claim 32 further comprising: data blocks and checksum blocks having a size smaller than 520 bytes per block.

43. The computer of claim 32 further comprising: data blocks and checksum blocks having a size of 512 bytes per block.

44. A method for storing data and checksums on a storage device, the method comprising the steps of:
    receiving N blocks of data at the storage device;
    computing at least one checksum for the N blocks of data; and
    storing the data in N blocks and the at least one checksum in an N+1 block, the N+1 blocks being logically grouped so that input/output operations may be performed on all N+1 blocks in one operation on the storage device.

45. The method of claim 44 further comprising: using a disk as the storage device, the disk drive having a plurality of sectors as the plurality of blocks.

46. The method of claim 44 further comprising: using read/write operations as the input/output operations.

47. The method of claim 44, further comprising:
    storing eight blocks of data; and
    storing the at least one checksum in a ninth block.

48. The method of claim 44, further comprising: using blocks that contain 512 bytes.

49. The method of claim 44 further comprising: computing a single checksum for the N blocks of data.

50. The method of claim 44, further comprising: computing a checksum that contains 64 bytes of checksum information.

51. The method of claim 44, further comprising: storing the N+1 blocks contiguously on the storage device.

52. A storage device for storing data and checksums, comprising:
    a storage operating system to receive N blocks of data;
    a processor to compute at least one checksum for the N blocks of data; and
    a checksum module to store the data in N blocks and the at least one checksum in an N+1 block, the N+1 blocks being logically grouped so that input/output operations may be performed on all N+1 blocks in one operation on the storage device.

53. The storage device of claim 52 further comprising: a sector as each of the plurality of blocks.

54. The storage device of claim 52 further comprising: read/write operations as the input/output operations.

55. The storage device of claim 52, further comprising: N+1 blocks that contain eight blocks of data and the at least one checksum in a ninth block.

56. The storage device of claim 52, further comprising: 512-byte blocks.

57. The storage device of claim 52 further comprising: a single checksum computed for the N blocks of data.

58. The storage device of claim 52, further comprising: 64-byte checksums.

59. The storage device of claim 52, further comprising: a contiguous grouping of the N+1 blocks on the storage device.

60. A storage device for storing data and checksums, comprising:
    means for receiving N blocks of data at the storage device;
    means for computing at least one checksum for the N blocks of data; and
    means for storing the data in N blocks and the at least one checksum in an N+1 block, the N+1 blocks being logically grouped so that input/output operations may be performed on all N+1 blocks in one operation on the storage device.

61. A computer readable media, comprising: the computer readable media containing instructions for execution on a processor for the practice of the method of,
    receiving N blocks of data;
    computing at least one checksum for the N blocks of data; and
    storing the data in N blocks and the at least one checksum in an N+1 block, the N+1 blocks being logically grouped so that input/output operations may be performed on all N+1 blocks in one operation.

* * * * *